US010567717B2

(12) United States Patent
Otani et al.

(10) Patent No.: US 10,567,717 B2
(45) Date of Patent: Feb. 18, 2020

(54) LIGHT SOURCE DEVICE AND PROJECTION TYPE DISPLAY APPARATUS INCLUDING LIGHT SOURCE DEVICE

(71) Applicant: CANON KABUSHIKI KAISHA, Tokyo (JP)

(72) Inventors: Akihiro Otani, Utsunomiya (JP); Masayuki Abe, Tokyo (JP); Minoru Ohkoba, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/192,519

(22) Filed: Nov. 15, 2018

(65) Prior Publication Data

US 2019/0158791 A1    May 23, 2019

(30) Foreign Application Priority Data

Nov. 22, 2017 (JP) .................................. 2017-225128
Aug. 24, 2018 (JP) .................................. 2018-157277

(51) Int. Cl.
| G03B 21/20 | (2006.01) |
| G03B 21/16 | (2006.01) |
| H04N 9/31 | (2006.01) |
| F21V 29/70 | (2015.01) |
| G03B 33/12 | (2006.01) |

(52) U.S. Cl.
CPC ........... *H04N 9/3161* (2013.01); *F21V 29/70* (2015.01); *G03B 21/16* (2013.01); *G03B 21/204* (2013.01); *G03B 33/12* (2013.01)

(58) Field of Classification Search
CPC .... G03B 21/204; G03B 21/16; H04N 9/3158; H04N 9/3161; F21V 29/70
See application file for complete search history.

(56) References Cited

U.S. PATENT DOCUMENTS

2018/0356715 A1* 12/2018 Kobayashi ............. G03B 21/16

FOREIGN PATENT DOCUMENTS

| JP | 2014-123014 A | 7/2014 |
| JP | 2014-165058 A | 9/2014 |
| WO | 16/185850 A1 | 11/2016 |

* cited by examiner

*Primary Examiner* — Ryan D Howard
(74) *Attorney, Agent, or Firm* — Canon USA, Inc. IP Division

(57) ABSTRACT

A light source device includes a wavelength conversion element having a fluorescent body for converting a wavelength of light from a light source, a light condensing member for condensing light from the light source to the wavelength conversion element, the light condensing member being arranged to face a surface of the fluorescent body, and a heat conductive member having heat conductivity greater than heat conductivity of the light condensing member, wherein an area where at least a part of the fluorescent body, the heat conductive member, and the light condensing member are overlapped and in contact with each other in this order is arranged, when viewed from an optical axis direction of the light condensing member.

11 Claims, 6 Drawing Sheets

LIGHT SOURCE DEVICE AND PROJECTION TYPE DISPLAY APPARATUS INCLUDING LIGHT SOURCE DEVICE

BACKGROUND

Field of the Disclosure

The present disclosure generally relates to a light source device and a projection type display apparatus including the light source device, and particularly relates to a light source device including a solid-state light source.

Description of the Related Art

In recent years, as a light source of a projector such as a projection type display apparatus, much attention has been given to a laser light source (solid-state light source) using a semiconductor light emitting element, such as a laser diode, because of a demand for high durability and high luminance.

In a case of a projector in which a laser diode for emitting blue light is used as a laser light source, for example, the projector condenses the emitted blue light on a fluorescent body via a light condensing optical system, converts a wavelength of the condensed light by fluorescent conversion, and emits light including green light and red light.

When the laser light is condensed on the fluorescent body, energy is concentrated on a minute area. This causes temperature rise in the fluorescent body. If the fluorescent body has a high temperature, fluorescent conversion efficiency may be lowered, and the property of the fluorescent body may be changed, which causes a lifetime of the fluorescent body as a light source to be shortened.

According to a light source device discussed in Japanese Patent Application Laid-Open No. 2014-165058, one surface of a fluorescent body is in close contact with a substrate having low thermal resistance to transmit heat in the fluorescent body to a heatsink from the substrate. Another surface of the fluorescent body is also in close contact with a light condensing optical system to transmit heat in the fluorescent body to a spacer arranged in a periphery of the fluorescent body from the light condensing optical system. Cooling efficiency is therefore increased. In addition, the spacer is configured to seal the periphery of the fluorescent body, so that adhesion of dust or fine particles to the fluorescent body due to light energy can be suppressed. This further prolongs the lifetime of the light source device.

As described above, in Japanese Patent Application Laid-Open No. 2014-165058, heat in the fluorescent body is transmitted to the light condensing optical system in such a manner that the surface of the fluorescent body is arranged in close contact with the light condensing optical system. However, because glass or quartz is used as a material of the light condensing optical system, there is a case where heat cannot be dissipated sufficiently.

SUMMARY

Therefore, the present disclosure is directed to a light source device having improved cooling efficiency for a fluorescent body and a projection type display apparatus including the light source device.

According to one or more aspects of the present disclosure, a light source device includes a wavelength conversion element including a fluorescent body for converting a wavelength of light from a light source, a light condensing member for condensing light from the light source to the wavelength conversion element, the light condensing member being arranged to face a surface of the fluorescent body, and a heat conductive member having heat conductivity greater than heat conductivity of the light condensing member, wherein at least a part of the fluorescent body, the heat conductive member, and the light condensing member are overlapped and in contact with each other in this order when viewed from an optical axis direction of the light condensing member.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the accompanying drawings.

<Optical Configuration>

Optical configurations of a light source device 20 and a projection type display apparatus 10 including the light source device 20 according to a first exemplary embodiment of the present disclosure will be described with reference to FIG. 1.

Figure 1:
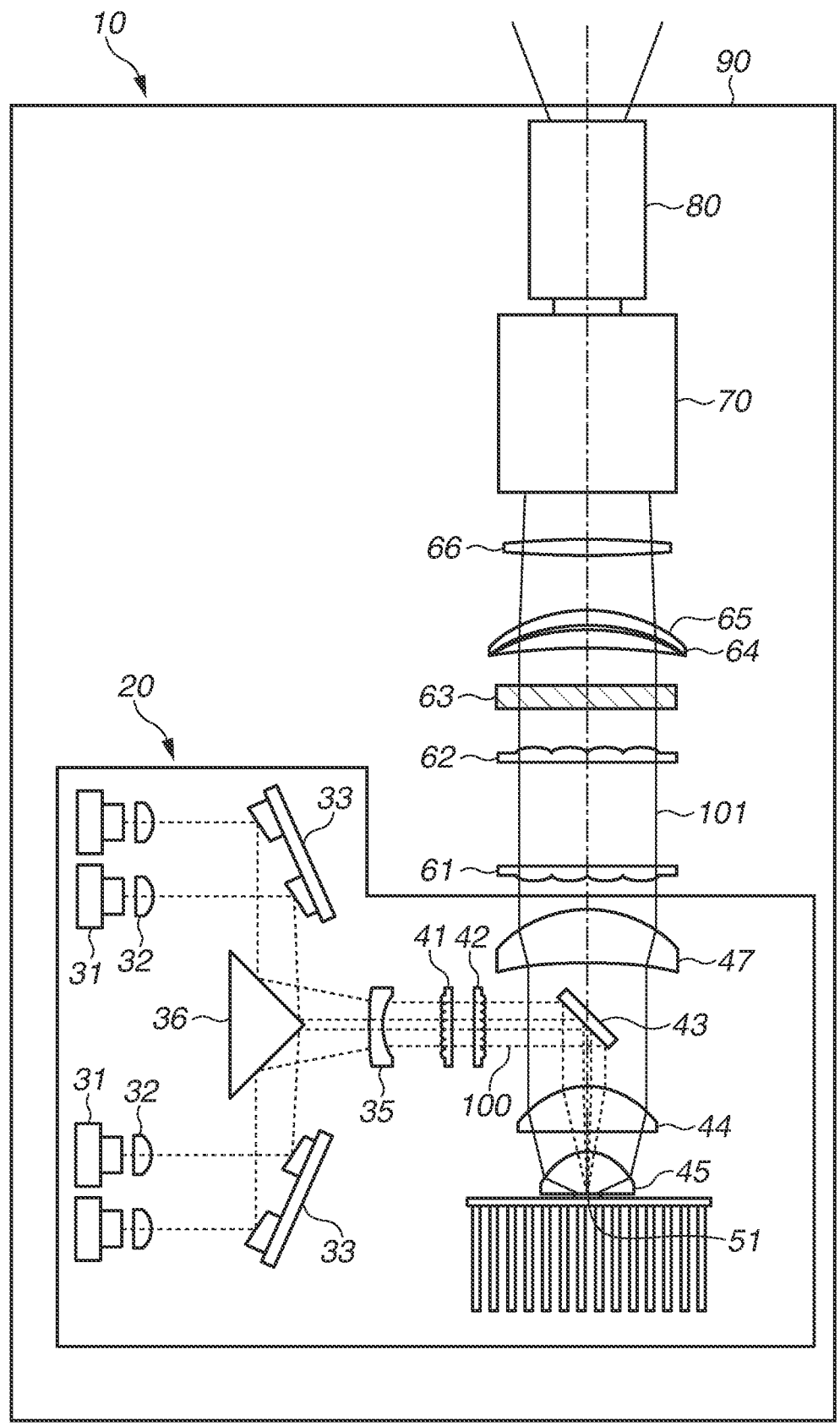
FIG. 1 is a diagram illustrating the optical arrangement of a projection type display apparatus according to a first exemplary embodiment.

FIG. 1 is a diagram illustrating the optical arrangement of the projection type display apparatus 10 according to the present exemplary embodiment.

<Light Source Device>

The light source device 20 is configured of a plurality of laser diodes (LD) (i.e., solid-state light source) 31, a compression optical system, a light condensing optical system, and a fluorescent body 51. In the present exemplary embodiment, each of the plurality of LDs 31 is a laser diode (semiconductor laser) that emits blue laser light 100.

The compression optical system includes a collimator lens 32, a reflection mirror array 33, a folding mirror 36, and a meniscus lens 35. The compression optical system compresses and reduces a size of a light flux of the laser light (excitation light) 100 from the LDs 31 indicated by a dashed line in FIG. 1, and emits the laser light 100 to the light condensing optical system described below.

The light condensing optical system includes a first microlens array 41, a second microlens array 42, a dichroic mirror 43, a first condenser lens 44, and a second condenser lens 45. The laser light 100 emitted from the compression optical system is condensed to a spot having a specific diameter through the light condensing optical system and incident on the fluorescent body 51 that serves as a part of a wavelength conversion element described below.

The fluorescent body 51 performs wavelength conversion to convert a part of the laser light 100 into light having a red spectrum and a green spectrum as dominant wavelength bands (i.e., fluorescent conversion). Specifically, the fluorescent body 51 is formed of a fluorescent material dispersed on low-melting-point glass and fixed onto a base member. This fluorescent material has a characteristic of generating fluorescent light having a wavelength different from that of excitation light by converting the wavelength of excitation light when the laser light 100 as excitation light is incident thereon. In addition, the low-melting-point glass has a glass-transition temperature lower than that of normal glass (e.g., 600 degrees or lower).

Light of which wavelength is converted by the fluorescent body 51 is reflected on a high reflection layer 52 serving as a part of the wavelength conversion element and emitted from the wavelength conversion element. Further, even if the laser light 100 is incident on the wavelength conversion element, a part of the laser light 100 remains as blue light since the wavelength of the part of the laser light 100 is not converted by the fluorescent body 51, and is reflected on the high reflection layer 52 and emitted from the fluorescent body 51.

In other words, light reflected on the high reflection layer 52 and emitted from the wavelength conversion element is light of three primary colors of red, green, and blue, emitted as white light 101 indicated by a solid line in FIG. 1. The white light 101 travels to the second condenser lens 45, the first condenser lens 44, and the dichroic mirror 43.

A surface of the dichroic mirror 43 is coated with a multilayer film. This multilayer film has a characteristic of reflecting or transmitting incident light according to a wavelength of the incident light. In other words, the multilayer film serves as a reflection film having a wavelength selectivity, having a characteristic of reflecting blue light and transmitting red light and green light of which wavelengths are converted by the fluorescent body 51.

Accordingly, the red light and the green light can pass through the dichroic mirror 43. The blue light can pass though the outside of the dichroic mirror 43 although a part of the blue light is reflected on the dichroic mirror 43. Accordingly, light of three primary colors of red, green, blue, i.e., white light 101, can be taken out from the light source device 20.

Then, the white light 101 emitted from the light source device 20 travels to an illumination optical system described below after a light flux of the white light 101 is expanded by an afocal lens 47.

Further, in the present exemplary embodiment, the above configuration has been described as an example of an optical configuration of the light source device 20. However, the configuration of the light source device 20 is not limited to the above. In other words, as long as the light source device 20 includes a light condensing optical system for condensing light from a light source to a fluorescent body and the fluorescent body for converting at least a part of condensed light to light having a wavelength different from the wavelength of the incident light, another optical system may be configured according to a purpose.

<Illumination Optical System>

An illumination optical system includes a first fly-eye lens 61, a second fly-eye lens 62, a polarization conversion element 63, a first condenser lens 64, a second condenser lens 65, and a third condenser lens 66. While the white light 101 passes through the first fly-eye lens 61 and the second fly-eye lens 62, brightness of the white light 101 becomes uniform, and the colors thereof are superimposed with each other, so that a light flux with less color variability can be acquired.

The white light 101 emitted from the illumination optical system is subsequently incident on a color separation/combination optical system 70.

<Color Separation/Combination Optical System>

A color separation/combination optical system 70 includes a dichroic mirror (not illustrated), a polarization beam splitter (not illustrated), a reflection type liquid crystal panel (not illustrated) as a color modulation element, and a combination beam splitter (not illustrated). The white light 101 incident on the color separation/combination optical system 70 is separated into components of respective wavelengths and emitted to reflection type liquid crystal panels corresponding to the respective wavelengths. The light reflected on the reflection type liquid crystal panels is combined by a combination beam splitter and emitted to a projection lens (projection optical system) 80, so that light is expanded and projected on a projection surface, such as a screen.

Next, a configuration for efficiently cooling the fluorescent body 51, which is regarded as one characteristic of the present exemplary embodiment, will be described with reference to FIGS. 2 and 3. It is known that the fluorescent body 51 generates heat because of heat generation caused by fluorescent conversion or because of energy of excitation light when the laser light 100 as excitation light is incident on the fluorescent body 51 in a spot-like state. If the fluorescent body 51 is in a heated state for a long time, conversion efficiency of the fluorescent body 51 is lowered. Temperature increase in the fluorescent body 51 therefore should be avoided, and thus a structure for cooling the fluorescent body 51 has to be provided in a periphery of the waveform conversion element.

Figure 2:
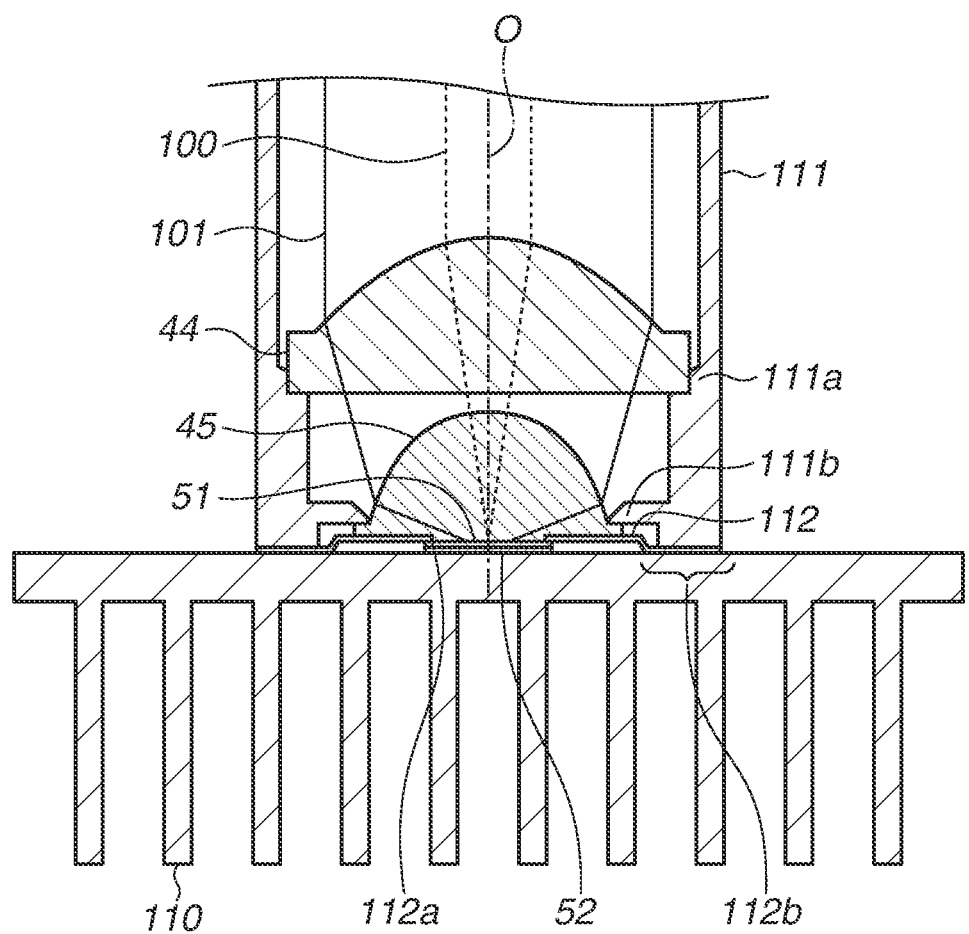
FIG. 2 is a cross-sectional diagram illustrating a configuration in a periphery of a fluorescent body according to the first exemplary embodiment.

FIG. 2 is a cross-sectional diagram illustrating a configuration in a periphery of the fluorescent body 51 according to the present exemplary embodiment. Specifically, FIG. 2 illustrates a cross-sectional view taken along a surface passing through an optical axis O of the laser light 100 from the light source (also see FIG. 1). FIG. 3 is a diagram illustrating a configuration in the periphery of the fluorescent body 51 viewed in a direction in which the laser light 100 is incident, i.e., a diagram illustrating a front view viewed in the optical axis direction of the light source.

The wavelength conversion element is formed of a fluorescent layer including the fluorescent body 51 and a high reflection layer 52 which are stacked in layers. The fluorescent layer is arranged on an incident surface (i.e., a surface as a second surface) on which the laser light 100 is incident, and the high reflection layer 52 is arranged on a surface (i.e., a back surface as a first surface) opposite to the incident surface in a direction of the optical axis O of the light condensing optical system. In other words, the wavelength conversion element of the present exemplary embodiment is configured of the fluorescent layer and the high reflection layer 52 of the fluorescent body 51. For example, a reflection evaporated film can be used as the high reflection layer 52.

When the laser light 100 is incident on the fluorescent body 51 of the wavelength conversion element, the laser light 100 is converted to the white light 101 as described above. Then, the white light 101 is reflected on the high reflection layer 52 in a direction opposite to the incident direction, and emitted via the light condensing members (i.e., the second condenser lens 45 and the first condenser lens 44) described below.

A holding member 111 for holding the first condenser lens 44 and the second condenser lens 45 as light condensing members is arranged in a periphery of the fluorescent body 51. A first condenser lens holding portion 111a and a second condenser lens holding portion 111b are arranged on the holding member 111. The first condenser lens 44 and the second condenser lens 45 are held at a prescribed distance, so that the laser light 100 is condensed to an irradiation region having a prescribed size on the surface of the fluorescent body 51.

Further, a heat dissipation member 110 including a substrate is arranged to be in contact with (i.e., in surface contact with, or in close contact with) the high reflection layer 52 of the wavelength conversion element. With this configuration, the fluorescent body 51 and the high reflection layer 52 are thermally in contact with the heat dissipation member 110 without having a layer of air in between, so that heat generated in the fluorescent body 51 can be favorably dissipated to the heat dissipation member 110. In other words, thermal resistance between the wavelength conversion element and the heat dissipation member 110 can be reduced.

For example, a member including a combination of a substrate and a heatsink may be used as the heat dissipation member 110. The substrate may be a copper substrate or a substrate in which a member having thermal transport capability such as a heat pipe is embedded (e.g., a high heat conductive substrate, such as a single crystal diamond substrate). In this case, it is desirable that the high reflection layer 52, the high heat conductive substrate, and the heatsink be arranged in this order in a direction in which the laser light 100 is incident on the fluorescent body 51.

When the laser light 100 is incident on the fluorescent body 51, the fluorescent body 51 has a high temperature because light energy is concentrated on a minute area of the fluorescent body 51. However, through the above-described configuration, the fluorescent body 51 can be cooled down because heat generated in the fluorescent body 51 can be thermally transmitted to the heat dissipation member 110 (i.e., heat can be transmitted to the heatsink via the substrate).

Further, because the heat dissipation member 110 is configured of a substrate, regional rise in temperatures of the fluorescent body 51 caused by the laser light 100 can be temporarily and thermally dissipated by the substrate before heat is transmitted to the heatsink. Accordingly, the fluorescent body 51 can be cooled down more efficiently.

The heat transmitted to the heatsink portion of the heat dissipation member 110 can be transmitted to the outside of the projection type display apparatus 10 (see FIG. 1) by convectional heat transmission using, for example, a fan (not illustrated).

In other words, through the above-described configuration, heat can be favorably dissipated from a lower side of the wavelength conversion element, i.e., a side of the high reflection layer 52 of the wavelength conversion element.

A structure for favorably dissipating heat from the upper side of the wavelength conversion element, i.e., a side of the fluorescent body 51 of the wavelength conversion element, will be described. In the present exemplary embodiment, a surface of the fluorescent body 51 on which the laser light 100 is incident (i.e., a surface of the fluorescent layer) is arranged to face the surface of the second condenser lens 45. The surface of the second condenser lens 45 which faces the fluorescent body 51 has a planar portion vertical to the optical axis O. Therefore, the second condenser lens 45 can be held (fixed) in such a manner that the planar surface of the second condenser lens 45 is in contact with the surface of the fluorescent layer of the fluorescent body 51 (a surface on which the laser light 100 is incident).

In this case, surfaces of the second condenser lens 45 and the fluorescent body 51 are in contact with each other without having a layer of air therebetween, so that reflection of light which occurs in the interface between the air and the second condenser lens 45 or the interface between the air and the fluorescent body 51 can be suppressed. In other words, luminance of the laser light 100 incident on the fluorescent body 51 or luminance of the white light 101 reflected on the high reflection layer 52 of the fluorescent body 51 and returning to the second condenser lens 45 can be suppressed from being lowered by the reflection in the interface with the air. This can improve efficiency of the laser light 100 or the white light 101. In other words, because a surface of the fluorescent body 51 and a planar surface portion of the second condenser lens 45 are in contact with each other, intake efficiency of the laser light 100 incident on the fluorescent body 51 can be improved.

In addition to the above configuration, the second condenser lens 45 and the fluorescent body 51 are thermally connected to each other, so that heat generated in the fluorescent body 51 can be dissipated to the second condenser lens 45. In other words, thermal resistance between the wavelength conversion element and the second condenser lens 45 is reduced. Then, the heat transmitted to the second condenser lens 45 is dissipated or radiated from the surface of the second condenser lens 45 while being thermally transmitted or conducted to the second condenser lens holding portion 111b.

Further, at the contact portion between the fluorescent layer of the fluorescent body 51 and the second condenser lens 45, the fluorescent body 51 is not exposed to air. This suppresses deterioration or oxidization of the fluorescent body 51. Similarly, at the contact portion between the dissipation member 110 and the high reflection layer 52, the high reflection layer 52 is not exposed to the air. This also suppresses deterioration or oxidization of the high reflection layer 52.

Further, a heat conductive layer including a heat conductive member 112 having a sheet shape is arranged in a space between the surface of the fluorescent layer of the fluorescent body 51 and the planar surface of the second condenser lens 45. The heat conductive member 112 is made of a material having heat conductivity higher than that of the second condenser lens 45. Specifically, a material such as a graphite sheet may be used therefor. Alternatively, any material having heat conductivity at least higher than the heat conductivity of the second condenser lens 45 may be used.

Figure 3:
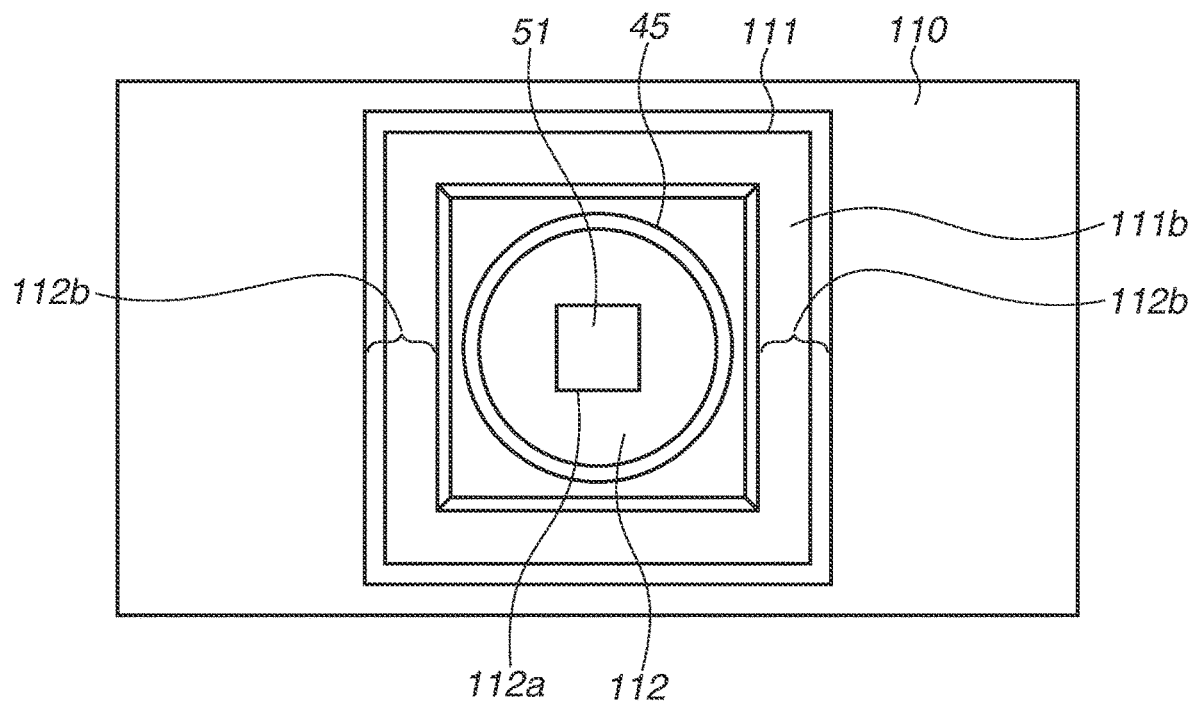
FIG. 3 is a diagram illustrating a configuration in a periphery of the fluorescent body according to the first exemplary embodiment viewed in a direction in which laser light is incident.

As illustrated in a top plan view in FIG. 3, an opening portion 112a having an incident position of the laser light 100 at the center is arranged on the heat conductive layer of the heat conductive member 112 in such a manner that the laser light 100 and the white light 101 are not interrupted. In the present exemplary embodiment, an opening size of the opening portion 112a is smaller than the outer dimension of the fluorescent body 51. More specifically, there is an area where the heat conductive layer of the heat conductive member 112 and the fluorescent body 51 are overlapped with each other when viewed in a direction of an optical axis of the second condenser lens 45. In other words, when viewed from a direction of the optical axis, there is an area where the fluorescent layer of the fluorescent body 51, the heat conductive layer of the heat conductive member 112, and the second condenser lens 45 as a part of the light condensing member are overlapped in this order in a layered manner.

In other words, the heat conductive member 112 has an area which is in contact with both of a planar surface portion of the second condenser lens 45 as a surface inside the closed space and the surface of the fluorescent body 51. Because the above-described area is provided on the heat conductive member 112, heat generated in the fluorescent body 51 can be also dissipated to the heat conductive member 112 having the heat conductivity higher than that of the second condenser lens 45. The heat thus can be dissipated favorably.

As illustrated in FIG. 3, it is desirable that the above-described area where the fluorescent layer of the fluorescent body 51, the heat conductive layer of the heat conductive member 112, and the second condenser lens 45 as a part of the light condensing member are overlapped in this order when viewed in a direction of the optical axis be arranged to surround the periphery of the opening portion 112a. In other words, it is desirable that the above-described area be arranged to surround an area in the fluorescent layer on which light from the light source is incident. Alternatively, similar effect can be acquired as long as a part of the area is arranged in the above-described manner.

Further, as illustrated in FIG. 2, an extending portion 112b extending from the outer diameter of the second condenser lens 45 to the outside in the diameter direction is arranged on the heat conductive member 112, so that the extending portion 112b is in contact with the heat dissipation member 110. In other words, the extending portion 112b extending to the outer portion of a containing portion (closed space) configured of or surrounded by the holding member 111, heat dissipation member 110, and the second condenser lens 45 is arranged on the heat conductive member 112 (in FIG. 3, the extending portion 112b is provided behind the holding member 111 and the second condenser lens holding portion 111b.) Because the above-described extending portion 112b is arranged thereon, heat generated in the fluorescent body 51 can be efficiently released to the heat dissipation member 110. The fluorescent body 51 thus can be cooled down efficiently.

According to the present exemplary embodiment, the heat conductive member 112 can transmit heat that is transmitted to the second condenser lens 45 from the fluorescent body 51 to the heat dissipation member 110 more efficiently than the second condenser lens 45. At the same time, the heat conductive member 112 can directly transmit heat, transmitted to the second condenser lens 45 from the fluorescent body 51, externally from the closed space not via the heat dissipation member 110. Further, heat from the fluorescent body 51 is directly transmitted to the heat conductive member 112 having heat conductivity higher than that of the second condenser lens 45 not via the second condenser lens 45.

Furthermore, the sealing property in the peripheries of the second condenser lens 45 and the fluorescent body 51 can be maintained, i.e., lowering of transmissivity caused by contamination is suppressed, and heat from the fluorescent body 51 also can be transmitted to the heat dissipation member 110 and the holding member 111 via the heat conductive member 112.

Further, for the purpose of improving in extraction efficiency (utilization efficiency) of the white light 101 emitted via the light condensing optical system, increasing an effective light flux of the white light 101 may be considered. In this case, the second condenser lens 45 may be increased in size. The above-described configuration is effective in this case. In other words, high cooling efficiency can be maintained regardless of a dimension of the outer diameter of the second condenser lens 45.

Further, the wavelength conversion element of the present exemplary embodiment is arranged inside the containing portion (closed space) including or surrounded by the holding member 111, the heat dissipation member 110, and the second condenser lens 45. Because the containing portion is a closed space which is not exposed to the ambient air, dust in its periphery can be prevented from entering thereto. Therefore, arranging the wavelength conversion element in the containing portion can prevent adhesion of dust to the wavelength conversion element. Although it is desirable that the containing portion be a sealed space, the containing portion may have a certain gap through which dust cannot enter.

<Manufacturing Method>

Further, the light source device 20 according to the present exemplary embodiment can be manufactured through a method including the processing of integrally molding the heat conductive member 112 and the second condenser lens 45. Because of this molding processing, the heat conductive member 112 may be provided with a hole through which a melted material of the second condenser lens 45 passes through.

The manufacturing method is not limited to the integral molding method. For example, the heat conductive member 112 can be held between the second condenser lens 45 and the fluorescent body 51. Alternatively, for example, the heat conductive member 112 can be adhered to the second condenser lens 45 with an adhesive member or an adhesive material.

Further according to the present exemplary embodiment, the heat conductive member 112 is molded so that the heat conductive member 112 has a surface that is not curved outward or inward with respect to the planar surface portion of the second condenser lens 45, i.e., the heat conductive member 112 has a surface identical to the planar surface portion of the second condenser lens 45. With this configuration, surfaces of the heat conductive member 112 and the second condenser lens 45 can be brought into contact with the surface of the fluorescent body 51. This prevents the conductive efficiency from being lowered.

Figure 4A:
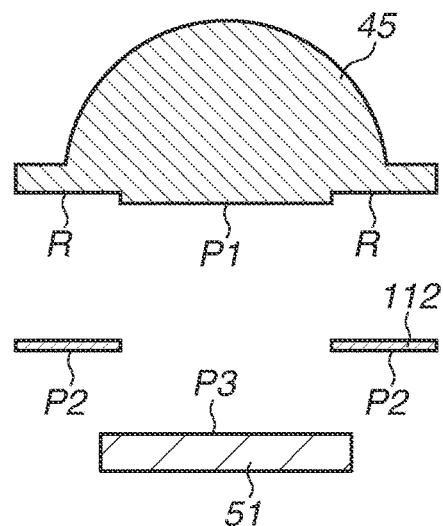
FIGS. 4A to 4E are diagrams schematically illustrating variation examples of a configuration in a periphery of the fluorescent body according to the first exemplary embodiment.

Definition of each surface in the present exemplary embodiment will be described with reference to the cross-sectional diagram in FIG. 4A. The second condenser lens 45 has a planar surface portion P1. A surface P2 of the heat conductive member 112 is positioned on a side of the fluorescent body 51. A surface P3 of the fluorescent body 51 is positioned on a side of the second condenser lens 45 and the heat conductive member 112.

Figure 4B:
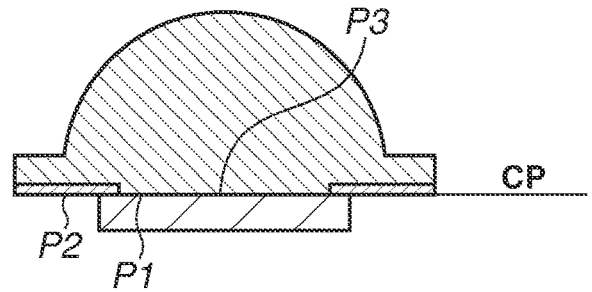

In the present exemplary embodiment, as described above, the heat conductive member 112 is integrally molded in such a manner that the heat conductive member 112 does not have a surface curved outward or inward with respect to the planar surface portion P1 of the second condenser lens 45. Further, as illustrated in FIG. 4A, a concave (recess) portion R corresponding to a thickness of the heat conductive member 112 can be previously formed on the second condenser lens 45, so that the heat conductive member 112 can be arranged on or adhered to the concave portion R. As illustrated in FIG. 4B, according to the present exemplary embodiment, the planar surface portion P1 of the second condenser lens 45 and the surface P2 of the heat conductive member 112 are arranged on the same surface CP, and the surface CP is in contact with the surface P3 of the fluorescent body 51, by any one of the above-described methods.

Variation Example

Next, with reference to cross-sectional diagrams in FIGS. 4C and 4D, another exemplary embodiment will be described with respect to a configuration for thermal contact between the second condenser lens 45, the fluorescent body 51, and the heat conductive member 112 of the present exemplary embodiment.

Although the surfaces of the second condenser lens 45 and the fluorescent body 51 are in contact with each other as illustrated in FIG. 4B, the configuration is not limited thereto. As illustrated in FIG. 4C, there may be a space between the planar surface portion P1 of the second condenser lens 45 and the surface P2 of the heat conductive member 112. FIG. 4C is a schematic diagram illustrating a state where a space M is arranged between the planar surface portion P1 and the surface P2.

Figure 4C:
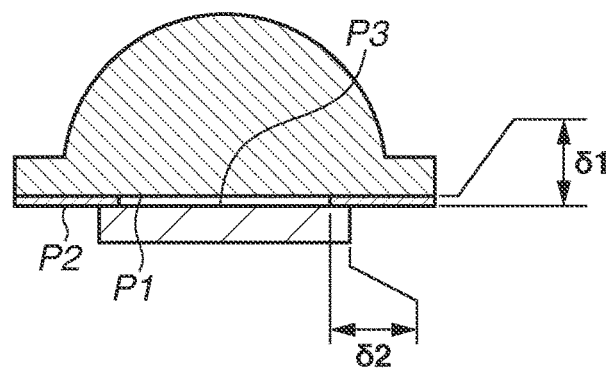

In FIG. 4C, for example, the heat conductive member 112 is formed into a sheet that is thin to such an extent that the second condenser lens 45 will not be loosened with respect to the fluorescent body 51, and this heat conductive member 112 is arranged and held between the second condenser lens 45 and the fluorescent body 51 having the planar surfaces. In other words, because of flexibility of the sheet or flexibility of a close contact portion of the fluorescent body 51 and the second condenser lens 45, the second condenser lens 45 can be substantially arranged close to the fluorescent body 51. Although a level difference $\delta 1$ in FIG. 4C is the same as the thickness of the heat conductive member 112, it is desirable that the level difference $\delta 1$ be 100 μm or less, or in the more desirable case, the level difference $\delta 1$ is 10 μm or less. Alternatively, it is desirable that the heat conductive member 112 can be deformed in a relatively flexible state, and that the heat conductive member 112 and the second condenser lens 45 be arranged to be nearly in surface contact with the fluorescent body 51 even in a case where the heat conductive member 112 is a thick member.

In addition, according to the configuration illustrated in FIG. 4C, it is desirable that an overlapping amount $\delta 2$ (i.e., an area where the heat conductive member 112 is in contact with both of the second condenser lens 45 and the fluorescent body 51) of the heat conductive member 112 and the fluorescent body 51 be smaller. With the above-described configuration, the second condenser lens 45 can be prevented from being loosened with respect to the fluorescent body 51. However, as illustrated in FIG. 4B, if the planar surface portion P1 and the surface P2 are arranged on the same planar surface, heat conductive efficiency will be improved when the overlapping amount is greater. Alternatively, the surface P3 of the fluorescent body 51 can have a clearance shape portion for the heat conductive member 112 (e.g., a concave surface or a chamfered shape portion corresponding to the thickness of the heat conductive member 112), so that the surface P3 of the fluorescent body 51 and the planar surface portion P1 of the second condenser lens 45 can be in contact with each other.

Figure 4D:
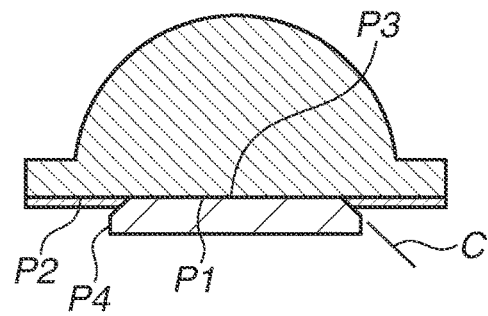
Figure 4E:
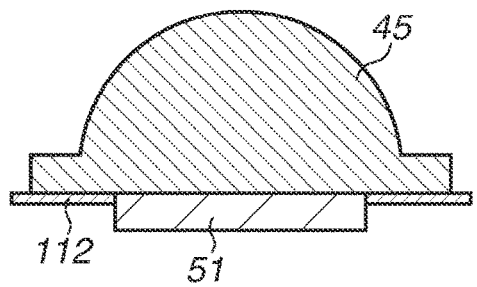

Further, as illustrated in FIG. 4D, a chamfered shape portion C may be provided on the fluorescent body 51, so that the second condenser lens 45 and the fluorescent body 51 are in contact with the heat conductive member 112 at the surface of the chamfered shape portion C. Furthermore, as illustrated in FIG. 4E, the heat conductive member 112 may be in contact with the side surface of the fluorescent body 51. Even if the heat conductive member 112 is arranged in the above-described state, heat of the fluorescent body 51 can be favorably dissipated to the heat conductive member 112 because there is an area where the fluorescent body 51 is in contact with the heat conductive member 112. Then, heat transmitted from the fluorescent body 51 to the second condenser lens 45 can be dissipated to the heat conductive member 112 because the heat conductive member 112 is also in contact with the second condenser lens 45.

In addition, the fluorescent body 51 may be configured of a fluorescent material in a crystal state or a powder state which is fixed or applied onto a base material with a resinous member so-called "binder". In this case, it is desirable that the clearance shape portion be arranged in an area of the base material or an area in which few fluorescent powder or no fluorescent powder is contained.

Hereinafter, a projection type display apparatus 10 according to a second exemplary embodiment, which is capable of efficiently cooling the fluorescent body 51, will be described with reference to FIGS. 5 and 6. The same reference number is applied to a configuration similar to that of the first exemplary embodiment, and description thereof will be omitted.

Figure 5:
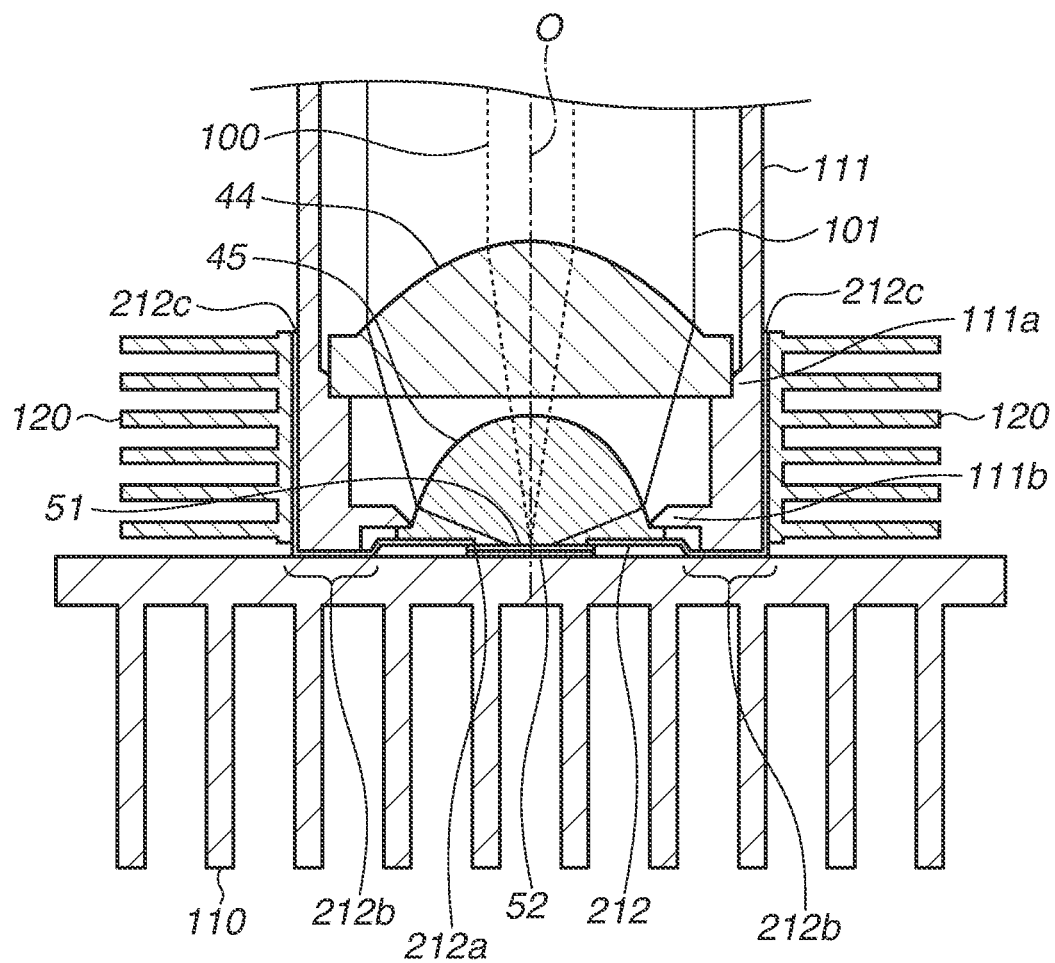
FIG. 5 is a cross-sectional diagram illustrating a configuration in a periphery of a fluorescent body according to a second exemplary embodiment.
Figure 6:
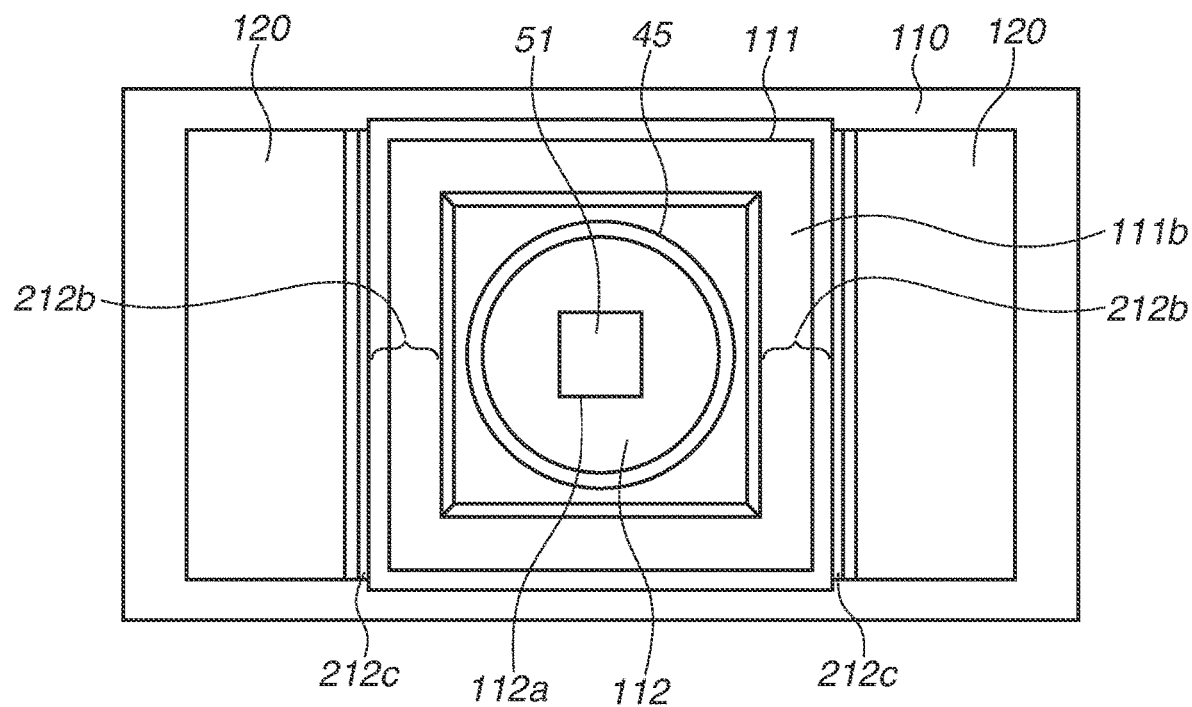
FIG. 6 is a diagram illustrating a configuration in a periphery of the fluorescent body according to the second exemplary embodiment viewed in a direction in which laser light is incident.

FIG. 5 is a cross-sectional diagram illustrating a configuration in a periphery of the fluorescent body 51 according to the present exemplary embodiment. FIG. 6 is a diagram illustrating a configuration in a periphery of the fluorescent body 51 according to the present exemplary embodiment viewed in a direction in which the laser light 100 from the light source is incident.

As illustrated in FIG. 5, according to the present exemplary embodiment, a heat dissipation member 120 is arranged on a side face of the holding member 111 in addition to the heat dissipation member 110.

Similar to the first exemplary embodiment, an extending portion 212b of a heat conductive member 212 according to the present exemplary embodiment is held and retained by the heat dissipation member 110 and the holding member 111. With this configuration, heat in the fluorescent body 51 can be efficiently transmitted to the heat dissipation member 110 and the holding member 111 while the sealing property in a periphery of the second condenser lens 45 and the fluorescent body 51 is maintained.

In addition, the heat conductive member 212 according to the present exemplary embodiment includes an extending portion 212c further extending from the extending portion 212b along the side face of the holding member 111.

The extending portion 212c is held between the holding member 111 and the heat dissipation member 120. With this configuration, heat in the fluorescent body 51 can be also transmitted to the heat dissipation member 120. In other words, the fluorescent body 51 can be cooled with higher efficiency.

As described above, according to the configuration described in the present exemplary embodiment, while the sealing property in a periphery of the fluorescent body 51 is maintained in order to prevent adhesion of dust to the fluorescent body 51, cooling efficiency achieved on a side of the condenser lens can be improved further than cooling efficiency according to the conventional configuration.

Further, the extending portion 212c of the heat conductive member 212 is extended further than the holding member 111, and a new heat dissipation member (in the present exemplary embodiment, the heat dissipation member 120) is added With this configuration, heat can be also transmitted to the extending portion 212c and heat dissipation member 120, so that cooling efficiency can be improved further.

Variation Example Common to Exemplary Embodiments 1 and 2

Although the exemplary embodiments of the present disclosure have been described as the above, the present disclosure is not limited to the above exemplary embodiments, and many variations and modifications are possible within the scope of the present disclosure.

For example, in the present exemplary embodiment, although the heat conductive member 212 is formed of a graphite sheet, the configuration is not limited to the above. In actual use, the heat conductive member 212 can be configured of a metallic mesh or a heat pipe having high heat conductivity.

Further, the fluorescent body 51 is formed of low-melting-point glass fixed to a base material. The fluorescent body 51 may be formed integrally with the holding member 111 with the low-melting-point glass, so that the condenser lens can be held thereby. In other words, the holding member 111 may be formed of low-melting-point glass that is used for forming the fluorescent body 51.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2017-225128, filed Nov. 22, 2017, and No. 2018-157277, filed Aug. 24, 2018, which are hereby incorporated by reference herein in their entirety.

What is claimed is:

1. A light source device comprising:
a wavelength conversion element including a fluorescent body for converting a wavelength of light from a light source;
a light condensing member configured to condense light from the light source to the wavelength conversion element, the light condensing member being arranged to face a surface of the fluorescent body;
a heat conductive member having heat conductivity greater than heat conductivity of the light condensing member; and
a heat dissipation member contacting with the heat conductive member,
wherein at least a part of the fluorescent body, the heat conductive member, and the light condensing member are overlapped and in contact with each other in this order when viewed from an optical axis direction of the light condensing member.

2. The light source device according to claim 1, wherein a surface of the fluorescent body and a surface of the light condensing member are arranged to be in contact with each other.

3. The light source device according to claim 1, wherein a surface of the fluorescent body and a surface of the light condensing member are arranged to face each other with a level difference of 100 μm or less therebetween.

4. The light source device according to claim 1, wherein a portion where the fluorescent body, the heat conductive member, and the light condensing member are in contact with each other is arranged to surround an area of the fluorescent body on which light from the light source is incident, when viewed from an optical axis direction of the light condensing member.

5. The light source device according to claim 1, wherein the wavelength conversion element is arranged in a space which is surrounded and formed by a plurality of members including the light condensing member, and the heat conductive member is arranged to extend externally from the space.

6. The light source device according to claim 5, wherein the wavelength conversion element is arranged on a heat dissipation member, and a portion of the heat conductive member extending externally from the space is arranged to be in contact with the heat dissipation member.

7. The light source device according to claim 1, wherein the heat conductive member has a shape larger than a size of the light condensing member in a radial direction.

8. The light source device according to claim 1, wherein the heat conductive member is provided with an opening portion from which the light from the light source incidents to the fluorescent body.

9. The light source device according to claim 8, wherein the size of the opening portion of the heat conductive member is smaller than the outward form of the fluorescent body.

10. The light source device according to claim 1,
wherein the wavelength conversion element further comprises a reflection layer,
wherein at least a part of the heat dissipation member, the reflection layer, the fluorescent body, the heat conductive member, and the light condensing member are overlapped and in contact with each other in this order when viewed from an optical axis direction of the light condensing member.

11. A projection type display apparatus comprising:
a wavelength conversion element including a fluorescent body for converting a wavelength of light from a light source;
a light condensing member configured to condense light from the light source to the wavelength conversion element, the light condensing member being arranged to face a surface of the fluorescent body;
a heat conductive member having heat conductivity greater than heat conductivity of the light condensing member;
a heat dissipation member contacting with the heat conductive member;
a light modulation element for modulating light from the light source device; and
an illumination optical system for illuminating the light modulation element with light from the light source device,
wherein at least a part of the fluorescent body, the heat conductive member, and the light condensing member are overlapped and in contact with each other in this order when viewed from an optical axis direction of the light condensing member.

* * * * *